United States Patent [19]

Vees et al.

[11] Patent Number: 4,664,961
[45] Date of Patent: May 12, 1987

[54] STRUCTURAL FIBER PRE-FORMS AND METHOD OF MAKING

[75] Inventors: Frederick Vees; Larry Carrington, both of Seguin, Tex.

[73] Assignee: Knytex, Inc., Seguin, Tex.

[21] Appl. No.: 590,439

[22] Filed: Mar. 16, 1984

[51] Int. Cl.$^4$ ............................................... B32B 3/06
[52] U.S. Cl. ..................................... 428/102; 66/192; 66/193; 112/262.1; 112/412; 112/435; 428/111; 428/294; 428/295; 428/375; 427/386; 427/387; 427/389.8; 427/389.9
[58] Field of Search ................ 112/121.14, 262.1, 412, 112/435; 428/375, 292, 294, 295, 102, 111; 66/192, 193; 427/386, 389.8, 389.9, 387

[56] References Cited

U.S. PATENT DOCUMENTS

| | | | |
|---|---|---|---|
| 3,459,612 | 8/1969 | Lee et al. | 112/262.1 X |
| 3,643,301 | 2/1972 | Weigl et al. | 112/412 X |
| 4,416,929 | 11/1983 | Kreuger | 428/292 X |

*Primary Examiner*—Michael R. Lusignan
*Attorney, Agent, or Firm*—Oblon, Fisher, Spivak, McClelland & Maier

[57] ABSTRACT

A structural fiber pre-form useful as a structural article when saturated with a resin which is subsequently cured is disclosed, which is comprised of a large number of tightly packed, parallel structural yarns. The yarns are held in alignment by a sewing yarn passing vertically around and between the yarns. The pre-form may be covered with a smooth covering, such as a fabric covering, which may either be sewn to the fiber pre-form in a single process, bound thereto by curing of a saturating resin, or a combination of processes. The method for making such pre-forms allows the pre-forms to be prepared in shapes which exhibit a transverse cross-section of variable heighth, which method comprises leading a large number of structural yarns or fibers through a guide means wherein these fibers are collected into adjacent bundles, the bundles immediately upon leaving the guide means, being sewn together by a sewing means which stitches across the assembled bundles in a direction perpendicular to the direction of advancement of the fibers. By altering the number of fibers lead through each guide means the height corresponding to that portion of the guide means where fewer fibers are introduced may be reduced.

15 Claims, 4 Drawing Figures

STRUCTURAL FIBER PRE-FORMS AND METHOD OF MAKING

BACKGROUND OF THE INVENTION

1. Field of the Invention:

This invention relates to structural articles prepared from structural fibers or stranded fibers which may be saturated with a curable resin, and thereafter incorporated into an article of manufacture as a structural element. More particularly, this invention relates to articles comprised of densely packed, parallel and oriented structural fibers, whose cross-section may be variable, and a method for making the same.

2. Description of the Prior Art:

For many years, structural elements, including those elements which must be rigid under pressure but not brittle or subject to deformation were conventionally made out of light weight metals and metal alloys, such as magnesium and aluminum. In particular, such light weight metal alloys have found application in the aerospace industry, particularly in the formation of vanes and propellers, as well as airplane and helicopter vehicle bodies, and in many transportation industries, such as the auto industry, wherein leaf springs are conventionally formed out a resilient metal such as the type mentioned. In fact, such metal articles continue to be the standard of the art today. However, these articles are expensive to produce, subject to raw material shortages and are subject to corrosion. Moreover, although constructed of light weight metals, they remain a substantial additional overall weight of the vehicle formed, thereby decreasing fuel economy.

Accordingly, there has recently been focused much attention on the production of articles and laminates including layers of "structural fibers" or stranded fibers collected into yarns. By structural fibers, it is herein meant a fiber having a substantial modulus, or yarn of the same, which is of sufficient strength to be employed in a load bearing or stress bearing capacity. In general, these fibers or yarns have a tensil modulus in excess of $5 \times 10^6$ PSI, and include, but are not limited to such materials such as "E" glass, "C" glass, "S" glass, Kevlar ® "29" and "49", carbon graphite and boron. Other similar materials will occur to those of ordinary skill in the art.

Generally, such articles are formed either by the weaving together of two or more systems of such yarns, where stress factors will allow weaving, or by nonwoven stitch-bonded laminates of layers of parallel strands of structural yarns. These woven or stitch-bonded "fabrics" are subsequently saturated with a curable resin, and yields surprising strength at greatly reduced weight cost.

Such fabrics exhibit superior strength in the direction of orientation of the strands or yarns. However, one shortcoming of these fabrics is the weakness of the fabric in a direction normal to the plane of an individual layer of the fabric. This weakness is generally overcome by forming a large number of superimposed layers, either through a laborious hand setting process, or such as that disclosed in U.S. patent application No. 536,734, filed Sept. 23, 1983, now U.S. Pat. No. 4,484,459, patented Nov. 27, 1984, and co-pending herewith. Where substantial stress is to be applied in a direction normal to the plane of the fabric, or where a "vertical" (the direction normal to the working surface of the stitching or weaving machine used to form the fabric) stress is applied, or article desired, the resulting piece is extremely bulky, consists of many open spaces and includes a large number of stitching or sewing or otherwise auxillary yarns which contribute little to the overall strength of the product. When saturated and cured, the open spaces have strength given only by the resin, and are susceptible to fracture.

A further difficulty frequently experienced is the need to provide a structural article which has a complex shape, or one that varies across the transverse cross-section of the article. Thus, propeller blades and wing or edge surfaces frequently require the formation of an article exhibiting a convex curve in profile. Alternatively, many structural beams and supports require a "I" or "L" shape. However, the above-described methods for forming a structural fabric are incapable of providing such complicated shapes, other than by resort to a laborious trimming and hand lay-up process, which is neither cost effective nor capable of giving reliable products, or by first saturating and curing a fabric, and thereafter trimming it to the desired shape, which requires heavy industrial cutting equipment, and is likely to induce fracture or stress points into the article prepared.

Accordingly, a need continues to exist for the provision of a light weight structural article formed from structural fibers or stranded fibers or yarns of the same material which overcomes the above-observed shortcomings of the existing art.

Further, there is a need for a structural article comprised of structural fibers which is compact and capable of resisting stress in the direction of the fibers, as well as a direction normal thereto.

Additionally, there is a need to provide such a structural article which can easily be formed into a complex shape, or a shape which has a variable transverse cross-section.

It is the object of this invention to satisfy the above-identified needs, and further provide a structural article having unusual and desirable properties, as described below.

SUMMARY OF THE INVENTION

The above-identified objects, as well as others, are met by the provision of a structural fiber pre-form which is comprised of tightly packed fibers, stranded fibers or yarns of the same (hereinafter the term yarn is understood to mean all three) which are held in this tight packing relationship by a vertical sewing thread or threads, which pass between or around the tightly packed fibers but do not pass therethrough. By tightly packed, it is intended to mean fibers which are adjacent and touching or in intimate contact with all the surrounding fibers, except where they are in contact with the vertical sewing thread. The fiber pre-form is of substantial thickness, greater than three times the diameter of a single yarn in thickness, and may be prepared having a cross-section of variable shape, that is, the height at any one point of the cross-section may be different than that at another.

These fiber pre-forms may be made by directing a large number, in excess of 500, yarn ends through closely packed guide means, such as metal tubes, wherein the yarns are grouped into a plurality of bundles. Where a variable transverse cross-section is desired, a greater number of yarn ends are passed through the portion of the guide means corresponding to those areas of increased height than those corresponding to other areas. Immediately adjacent the outlet end of the guide means there is positioned a sewing means, preferably a single head sewing machine, which passes a sewing yarn vertically between and around the yarns, thereby holding the bundled yarns in a tightly packed array. Simultaneously, a fabric or film "skin" may be stitch bonded to the yarns, using the same sewing yarn. The sewn pre-form is advanced by a take-up means, and cut into appropriate lengths. In most cases, cutting will be necessary, rather than rolling up on a reel, due to the rigidity of the sewn fiber pre-form.

After the pre-form has been cut to the desired length, it may be saturated with a conventional resin and subsequently cured through conventional molding techniques. Although any of a wide range of resins may be employed, exemplary resins include epoxy resins, Friedel-Crafts resins, phenolic/furan, polyester, polyimide, silicone and vinyl ester resins. Other, equivalent resins will occur to those of ordinary skill in the art, and may be employed in connection with the invention.

The pre-form may be saturated and cured alone, or incorporated into a complex structural object by molding and curing to some other article, either structural or decorative. Moreover, the shape of the eventual structural item may be made complex by curing together more than one pre-form article, in the form of a T or related structures. The molding technology necessary for such structures is known to those of skill in the art, and does not constitute a part of this invention.

DETAILED DESCRIPTION OF THE INVENTION

As noted, the invention disclosed and claimed herein is particularly valuable for the production of pre-form structural member having strength not only in the direction of the parallel fibers of that article, but also in a direction normal thereto. This strength is achieved through tight packing of a large number of fibers. Thus, generally, the articles of this invention are preferred where it is necessary to have a heighth along the transverse cross-section in excess of three times the diameter of the yarn employed, or three times the average diameter if a mix of yarns is employed, as articles thinner than that may be made by other means. In particularly preferred embodiments, the articles of this invention have a heighth of at least five times the diameter of the yarns used (5 yarns thick) at least one point along the cross-section. Of course, the process of this invention can be used to provide articles of any heighths, in cross-section, of one fiber or greater, and are particularly useful when producing fiber pre-forms wherein the cross-section is variable, and may, at certain points, fall below three times the diameter of the fibers.

Figure 2:
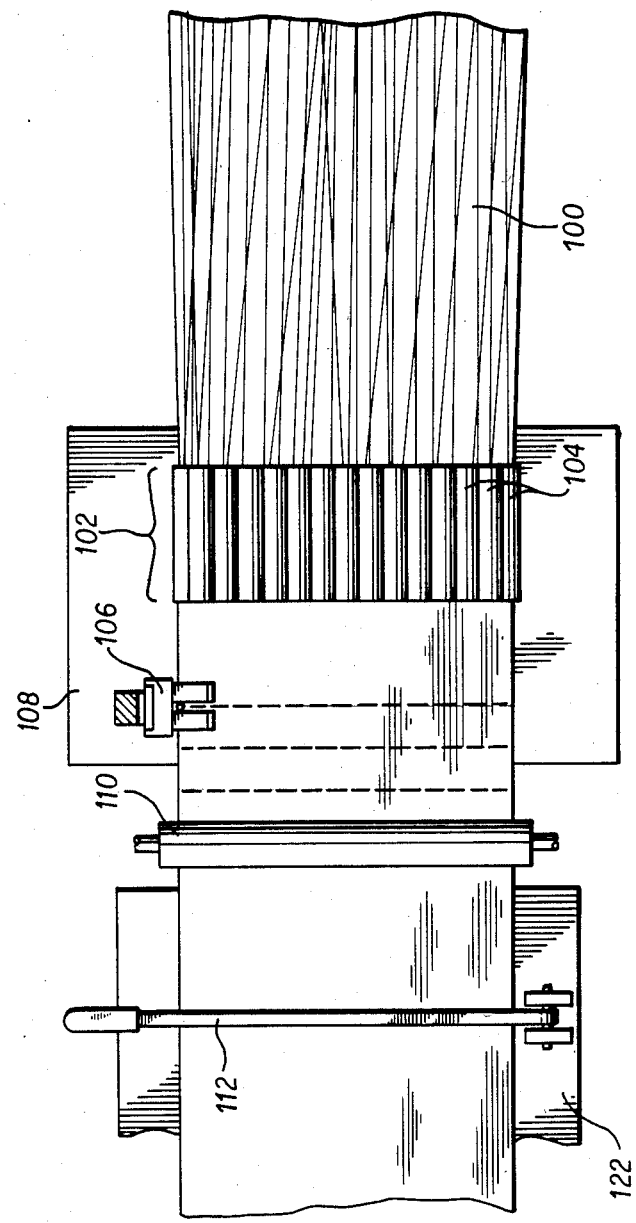
FIG. 2 is an overhead view of the process of this invention.

Such articles are produced, with reference to FIG. 2 by leading a large number yarns 100 from yarns sources (not illustrated) into a closely packed guide means 102.

By guide means, Applicant intends a device capable of combining yarns from widely spaced sources to a tightly packed bundle within the guide means. Exemplary guide means are toothed combs, wherein the yarns are gathered into bundles in the spaces between the dents of the comb, or plates or boards with closely spaced holes placed therein, wherein the yarns are gathered through the narrow holes.

One particularly preferred guide means that has been found to give excellent results is a series of adjacent narrow tubes, preferably made out of a light metal and having a smooth inner bore, to prevent snagging and other types of fiber degradation. The dimension of the inner opening of the tube is determined by the number of yarns that must pass through the tube corresponding to the greatest heighth of the article. As is apparent from FIG. 2, certain guide means will correspond to certain portions of the fiber pre-form, and where a variable cross-section is desired, those tubes 104 corresponding to areas of greater heighth will receive more yarn ends than other tubes.

Immediately adjacent guide means 102 is a sewing means 106. The sewing means should be as close to the outlet end of the guide means 102 as the apparatus permits, in order to bind the yarn bundles together into a fiber pre-form without separation of the bundles after leaving the guide means. Sewing means 106 moves relative to and across the gathered fibers in a direction which is other than parallel to their direction of advancement, preferably perpendicular, which advancement is caused by advancing means 110 which may be comprised of nip rollers, clamps or similar apparatus which provides tension. This relative motion may be effected by moving either the guide means, the sewing means, or both. The sewing means must pass the binding sewing yarn between and around the gathered fibers, but not through those fibers, as destruction of the fibers, which are, individually, often quite brittle due to their high modulus will result in a dramatic weakening of the article. Spacing can be determined by a preprogrammed computer operation, and the sewing yarn may be caused to pass between and around, rather than through, the fibers by use of specialized needles familiar to those of ordinary skill in the art, with a head or point constructed so as to avoid splintering fibers.

Guide means 102, the sewing head 106 and advancing means 110 are conveniently located on work table 108. As the fiber pre-form is advanced, it may be gathered on a take up roll or reel, if it has sufficient flexibility to assume the desired roll shape. However, frequently, the fiber preform will be so dense that its rigidity prevents rolling up. In this case, a shear or cut-off saw may be employed, to cut predetermined lengths of the sewn fiber pre-form. The lengths may be easily adjusted by placing the saw or other cutting means 112 on a movable table 122, so that the distance from the table 108 can be adjusted. At this point, the pre-forms are collected, and subjected to post-formation processing.

Figure 3:
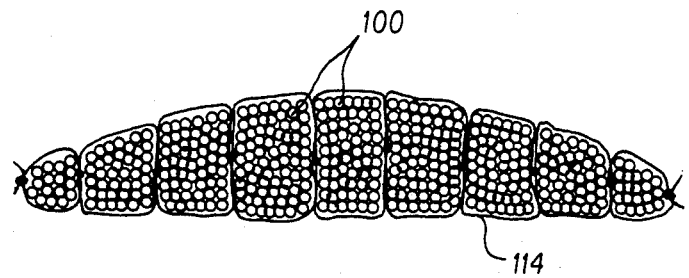
FIG. 3 is a cross-sectional (transverse) view of a fiber pre-form of this invention.

One typical article that may be produced by the above-described process is illustrated, in transverse cross-section, in FIG. 3. This fiber pre-form, when saturated with a subsequently cured resin and appropriately molded, has excellent application in situations where high stress is applied to a member whose wind resistance and wind flow characteristics are important. Thus, to make the article illustrated in FIG. 3, a large number of yarns are led through the central guide tubes in a guide means 102 consisting of twenty-four tubes 104 arranged in two rows of 12 adjacent tubes, while comparatively few yarns are led through the guide tubes at either end of the rows, which tubes correspond to the areas of lessened height in the article of FIG. 3. In a typical article of this nature, the number of yarns incorporated will run from 500–850 or more. These yarns are maintained in parallel, tightly packed array by sewing yarn 114 which is laid down by the sewing means 106.

Figure 1:
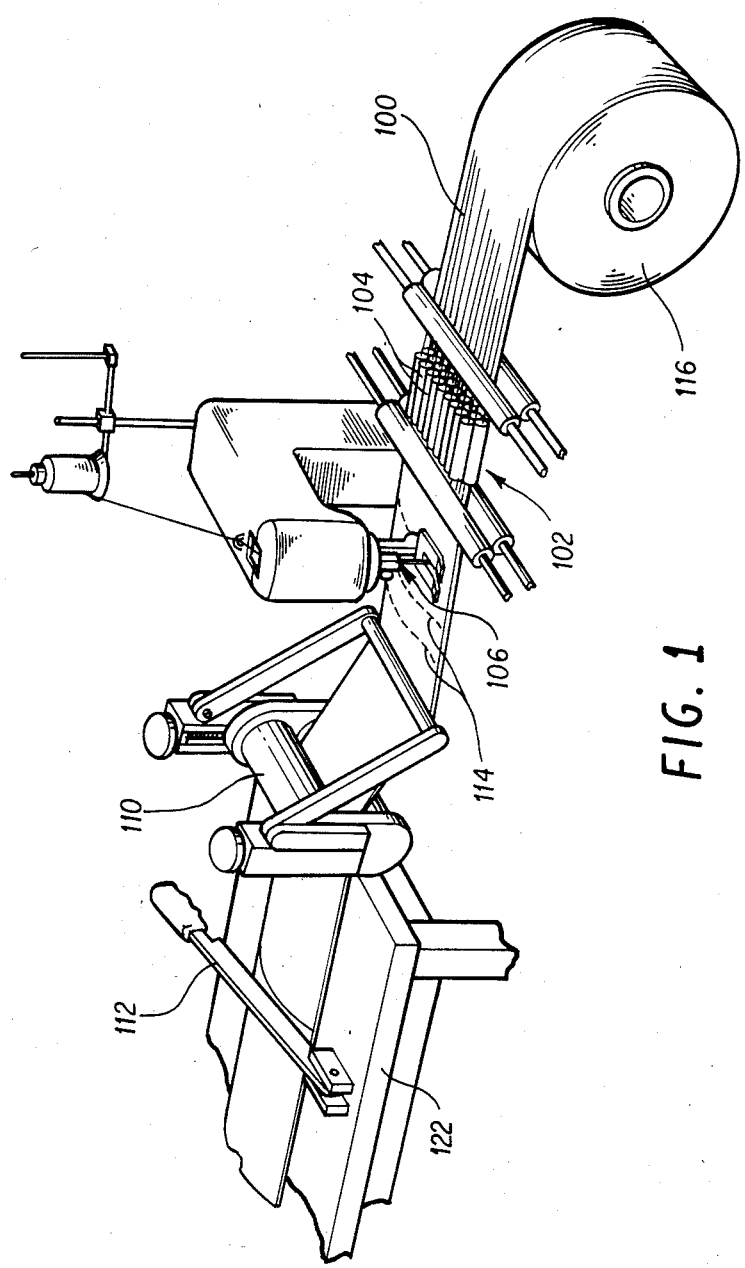
FIG. 1 is a side elevational view of the process of this invention, depicting the machinery that may be used therein.

In certain applications, where wind flow characteristics are critical, such as in wing and propeller surfaces, it is necessary to provide the fiber pre-form with a "skin" or smooth covering 120 which may be adhered to the fiber pre-form. This covering may generally be a smooth fabric or plastic sheet. In preferred applications, a biased fabric is desirable. As illustrated in FIG. 1, one method of incorporating such a skin is by placing the skin underneath the guide means and yarns directed thereto, and thereafter sewing the skin to the bottom of the fiber pre-form in the same operation wherein the pre-form is sewn together. In such a one-step process the skin 116 should be wide enough to be sewn to the bottom of the pre-form and have enough remaining to "flap over" the top and be secured thereto, so as to provide a complete envelope. This may be easily be effected by leaving half of the skin draped off the table so that it is not sewn or otherwise affixed to the pre-form before desired. The "flap" may be left unsecured until resin saturation, whereupon it will be secured with the curing of the resin, thereby avoiding the need for additional steps.

Figure 4:
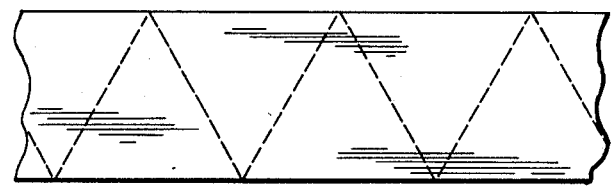
FIG. 4 is an overhead view of a fiber pre-form of this invention.

As illustrated in FIG. 2, sewing means 106 passes across the gathered yarns, and then passes back in a parallel row distant from the first row of sewn yarn 114. This spacing, which is predetermined, can easily be affected by causing the sewing means to pause while the fiber pre-form material is advanced, by advancing means 110. An alternative sewing pattern is illustrated in FIG. 4, where a zig-zag design is produced by causing the sewing means to continuously translate back and forth across the pre-form while the fiber pre-form is continuously advanced. Other sewing patterns, and combinations of patterns made using two or more sewing means, will be apparent to those of ordinary skill in the art.

As has been previously observed, the method and fiber pre-form claimed herein, although suitable for applications wherein the desired structural member has a uniform transverse cross-section, are particularly valuable when applied to articles whose transverse-cross-section is desired to be variable. Thus, the dome or convex curve shape of FIG. 3 is one shape having a wide application in a number of technologies. Another particularly valuable shape is an "airfoil" shape, having a rounded, blunt shape at one end tapering to a fine edge at the opposing end. All these shapes may be produced according to the claimed process, but by no other means that Applicant is aware of. In particular, it is known that the industry has persistently followed hand lay-up methods, wherein the variable cross-section is intended to be secured by the varying numbers of layers and shapes provided, for a great number of years. The systems have uniformly proved defective, particularly in light of the difficulty experienced in maintaining the shape once the appropriate lay-up has been secured, during curing and molding of the saturation resin. This invention also allows the inclusion of an unusually high number of yarns giving surprising and valuable strength due to their dense packing, which cannot be achieved by alternative means due to practical and machine limitations. Other applications will occur to those of ordinary skill in the art.

The above-described process and invention has been disclosed with respect to particular guide means, components and associated apparatus. The examples given herein, unless indicated otherwise, are not intended to limit the scope of this invention, and alternatives will occur to those of ordinary skill in the art without exercise of inventive faculty, which alternatives remain within the invention as claimed below.

What is claimed as new and desired to be secured by Letters Patent of the United States is:

1. A method for making a structural fiber pre-form comprising a plurality of parallel tightly packed structural yarns sewn together with auxillary yarns, said method comprising:

directing a plurality of said structural yarns from corresponding yarn sources through the upstream end of a guide means capable of grouping said structural yarns into a plurality of bundles, and directing said bundles from the downstream end of said guide means directly to a sewing means, whereat said bundles are sewn together into a fiber pre-form by repeatedly passing said auxillary yarns between and around said yarn bundles, and advancing said sewn fiber pre-form to a collection point.

2. The method of claim 1, wherein the transverse cross-section of said fiber pre-form is caused to be of varying height by passing a greater number of yarns through that portion of said guide means corresponding to areas of said fiber pre-form cross-section having a greater height than the number of yarns passed through those portions of said guide means corresponding to areas of lesser height.

3. The method of claim 2, wherein said guide means comprises central, lateral and a plurality of intermediate guide means therebetween, and a greater number of yarns are passed through said central guide means, with increasingly fewer yarns being passed through said intermediate guide means as said intermediate guide means are increasingly distant from said central guide means, the fewest yarns being directed through said lateral guide means, whereby said transverse cross-section defines a convex curve.

4. The method of claim 1, wherein said sewing means comprises a single sewing head, and said sewing is affected by causing the sewing head to undergo translational motion relative to said guide means in a direction perpendicular to the direction of advancement of the fiber pre-form while passing said auxillary yarn between and around said bundled yarn.

5. The method of claim 4, wherein said sewing head is caused to pause at the end of each movement across said bundled yarns while said fiber pre-form is advanced, prior to returning to the original point, whereby a series of rows of auxiliary yarn is formed.

6. The method of claim 4, wherein said single sewing head translates relative to said guide means continuously back and forth across said bundled yarns while said yarns and said fiber pre-form are advanced, thereby creating a zig-zag pattern of auxillary yarn.

7. The method of claim 1, wherein said fiber pre-form is collected at said collection zone and subsequently saturated with a curable resin, the resin thereafter being cured.

8. The method of claim 7, wherein said resin is selected from the group consisting of epoxy resins, Friedel-Crafts resins, phenolic/furan resins, polyester resins, polyimide resins, silicone resins, vinyl ester resins and mixtures thereof, and said structural fibers are selected from fibers of the group consisting of "E" glass, "C" glass, "S" glass, carbon, graphite, boron and mixtures thereof.

9. A structural fiber pre-form comprising a large number of tightly packed, parallel structural yarns, bound together by auxillary yarn passing vertically between and around said structural yarns, said fiber pre-form having a transverse cross-section of a height, at least at one point, in excess of three times the average diameter of said structural yarns.

10. The structural fiber pre-form of claim 9, wherein said transverse cross-section is of a variable height.

11. The structural fiber pre-form of claim 10, wherein said tansverse cross-section defines a convex curve.

12. The structural fiber pre-form of claim 10, wherein said transverse cross-section defines an airfoil.

13. The structural fiber pre-form of claim 9, wherein said structural fiber pre-form is saturated with a curable resin, which resin is subsequently cured.

14. The structural fiber pre-form of claim 9, wherein said fiber pre-form further comprises a smooth outer covering surrounding and bound to said structural yarns.

15. The structural fiber pre-form of claim 13, wherein said structural yarns are selected from the group consisting of "E" glass, "C" glass, "S" glass, carbon graphite, boron and mixtures thereof, and said resin is selected from the group consisting of epoxy resins, Friedel-Crafts resins, phenolic/furan resins, polyester resins, polyimide resins, silicone resins, vinyl ester resins and mixtures thereof.

* * * * *